Figure 1:
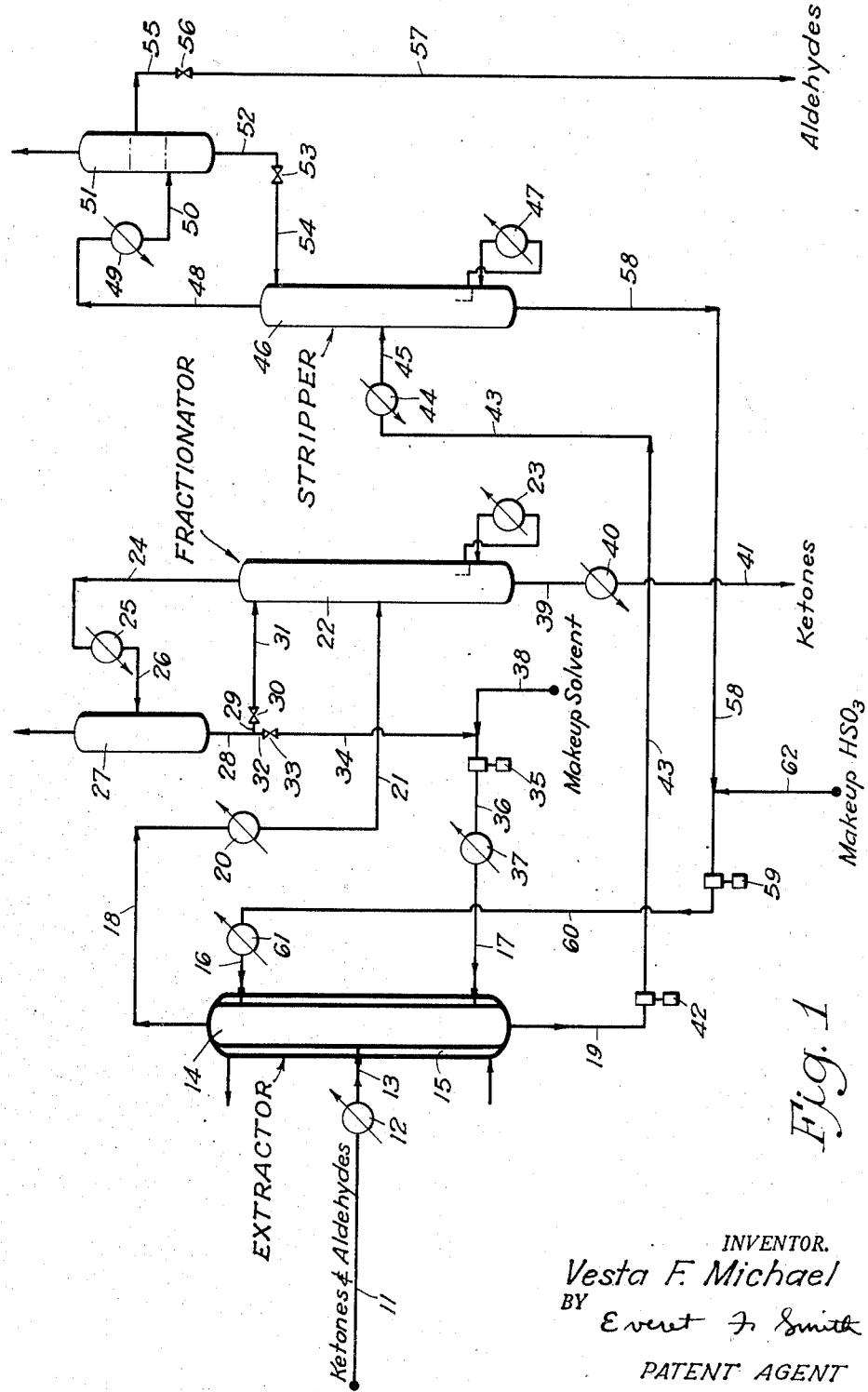

June 5, 1951     V. F. MICHAEL     2,555,553
SEPARATION OF ALDEHYDES AND KETONES
FROM MIXTURES THEREOF
Filed Sept. 24, 1947     2 Sheets-Sheet 2

INVENTOR.
Vesta F. Michael
BY
Everet F. Smith
PATENT AGENT

Patented June 5, 1951

2,555,553

UNITED STATES PATENT OFFICE 2,555,553

SEPARATION OF ALDEHYDES AND KETONES FROM MIXTURES THEREOF

Vesta F. Michael, Tulsa, Okla., assignor to Stanolind Oil and Gas Company, Tulsa, Okla., a corporation of Delaware Application September 24, 1947, Serial No. 775,920

12 Claims. (Cl. 260—593)

This invention relates to a method for effecting a separation between relatively bisulfite-unreactive and bisulfite-reactive compounds. More particularly, it relates to an improved method for separating a substantially purified ketone fraction and a substantially purified aldehyde fraction from a mixture comprising ketones and aldehydes.

I have discovered that bisulfite-aldehyde adducts remain comparatively stable as the temperature is raised to moderate levels above room temperature, whereas ketone-bisulfite adducts become less and less stable under the same conditions. On the basis of this discovery, I am now able to effect a separation between aldehydes and ketones by means of a simple but effective process which, in one embodiment, comprises converting a mixture of aldehydes and ketones into their bisulfite adducts, heating an aqueous solution of the adducts to an elevated temperature, and separating ketones therefrom, suitably by extraction with a water-immiscible solvent.

Within comparatively recent years, numerous chemical processes have been developed which produce mixtures of organic oxygenated compounds, including aldehydes and ketones. For example, the direct oxidation of natural gas or of other hydrocarbon gases produces a large variety of oxygenated compounds, including a major proportion of aldehydes and ketones. The so-called "Oxo" process, in which olefins are reacted with carbon monoxide and hydrogen, produces primarily aldehydes and alcohols, but the product ordinarily contains a minor proportion of by-product ketones. The Fischer-Tropsch synthesis, in which carbon monoxide is hydrogenated over a metal catalyst, suitably cobalt or iron, produces primarily hydrocarbons; but substantial quantities of oxygenated compounds are obtained in various embodiments of the process, particularly those embodiments employing iron or alkali-promoted iron catalysts.

An improved process for the hydrogenation of carbon monoxide, utilizing a fluidized catalyst, has recently been developed, one embodiment of which, for example, was found to produce an oil layer containing 6.38% by weight of oxygenated compound and an aqueous layer containing 3.74% by weight of oxygenated compounds under the following conditions:

| | |
|---|---|
| Catalyst | Iron |
| Promoter | 1.77% KF |
| Temperature | 592° F. |
| Pressure | 230 lb./in.², gage |
| Space velocity | 5.14 cu. ft. CO, measured at 60° F. and one atmosphere, per pound of iron per hour |
| CO concentration in feed | 9.3% by volume |
| H₂:CO ratio in feed | 5.5:1 |

Under the above conditions, the oxygenated constituents of the product were as follows:

Oil phase

| | |
|---|---|
| Specific gravity, 20/4° C. | 0.724 |
| Refractive index, 20° C. | 1.4113 |

| | Proportion | Mol. Weight |
|---|---|---|
| | Per cent by weight | |
| Aldehydes and ketones | 5.6 | 122 |
| Alcohols | 0.29 | 124 |
| Acids | 0.49 | 136 |

Aqueous phase

| | Per cent by weight |
|---|---|
| Acetaldehyde | 0.06 |
| Propionaldehyde | 0.06 |
| Acetone-methanol | 0.59 |
| Butyraldehyde-ethanol | 0.05 |
| Methyl ethyl ketone-ethanol | 0.25 |
| Ethanol[1] | 0.86 |
| 1-propanol[2] | 0.51 |
| 1-butanol and heavier | 0.28 |
| Acids (as acetic) | 1.08 |

[1] Contained small proportion of methyl propyl ketone.
[2] Contained small proportion of methyl butyl ketone.

Obviously, the isolation of individual components from such mixtures would be extremely difficult by any of the methods known in the art. The isolation of aldehydes and ketones from such mixtures is particularly difficult, owing to their tendency to form azeotropes with numerous other compounds, resulting probably from their readiness to undergo hydrogen bonding, and owing to their chemical reactivity, as a result of which they tend to form acetals and ketals with alcohols, and to undergo aldol condensation and subsequent dehydration.

It has previously been shown that various aldehydes and ketones exhibit a wide variation in their reactivity toward water-soluble bisulfites. I have now discovered that the reactivity of ketones with bisulfites decreases rapidly as the reaction temperature is raised above about 40° C., whereas the reactivity of aldehydes with bisulfites actually undergoes a marked increase at temperatures up to around 80° C. On the basis of this discovery, I have now devised methods for effecting the partial or complete separation of aldehydes and ketones from each other and from bisulfite-unreactive materials.

One object of my invention is to effect a separation of various groups of organic oxygenated compounds from mixtures thereof. Another object of my invention is to effect a separation between aldehydes and ketones. A further object of my invention is to separate and purify the components of a mixture containing aldehydes and ketones. A still further object of my invention is to prepare substantially pure aldehydes and ketones from mixtures thereof. Other objects will be apparent from the following description.

Various combinations of process steps may be devised, based on my discovery, for carrying out the separation of aldehydes and ketones. I may, for example, prepare an aqueous solution of mixed bisulfite-aldehyde and bisulfite-ketone adducts, suitably by commingling an aqueous bisulfite solution with a mixture of aldehydes and ketones, or by extracting mixed aldehydes and ketones from solution in an organic solvent. The aqueous solution of mixed bisulfite adducts is then heated to an elevated temperature, ordinarily above about 40° C., and the ketones, which tend to be preferentially liberated thereby, are removed from the solution, suitably by stripping with an inert gas, or by steam distillation under a pressure so regulated as to maintain the desired temperature, or preferably by extraction with an immiscible solvent, as defined below. The aldehydes may then be recovered from the aqueous raffinate in a variety of ways, such as by heating to a temperature above about 100° C. and subsequently steam distilling, stripping with an inert gas, or extracting with a water-immiscible solvent, or by adding a strong acid or a strong base to destroy the bisulfite-aldehyde adducts and subsequently separating the regenerated aldehydes by stratification, extraction, or stripping.

Numerous modifications may be made in the basic process. It will be apparent, for example, that the simple process outlined above, when carried out by means of batch extractions, will tend to give a ketone product contaminated with aldehydes, owing to the equilibria which exist between aldehydes and bisulfites even at the elevated temperatures used in my process. It is therefore advantageous to employ countercurrent operations in all of the various extractions used in applying my invention, and it is particularly advantageous to employ a double countercurrent treatment of aldehydes and ketones with an aqueous bisulfite solution and with an organic solvent, as illustrated in Figure 1 and described more fully below.

The temperature used in my process during the separation of liberated ketones from the aqueous bisulfite-adduct solution should preferably be between about 40 and 80° C. However, my process is operative at somewhat higher temperatures, since the equilibria at such temperatures permit the formation of substantial quantities of the bisulfite-aldehyde adducts, while preventing the formation of bisulfite-ketone adducts; and my process is operative at temperatures somewhat below 40° C., since any increase in temperature over the temperatures used in the prior art favors the advantageous displacement of the ketone-bisulfite adduct toward the ketone and of the aldehyde-bisulfite adduct toward the adduct.

The aqueous bisulfite solutions and bisulfite-adduct solutions should be kept ordinarily between about pH 2.2 and 8, and preferably between about pH 5 and 8, except during any optional chemical treatment, such as the addition of acid or alkali, to regenerate aldehydes or ketones therefrom. The pH may be adjusted by addition of an alkaline material, such as sodium hydroxide, or an acidic material, preferably sulfur dioxide or sulfurous acid, or a buffering agent, such as an acid sodium phosphate.

Water-soluble bisulfites in general are suitable for use in my process. Among such bisulfites are the bisulfites of the alkali metals, specifically lithium, sodium, potassium, rubidium, and cesium; the alkaline-earth metals, such as calcium and barium; ammonium; and substituted ammoniums, such as ethylammonium, dimethylammonium, tris(2-hydroxyethyl)ammonium, benzyltrimethylammonium, and the like.

The bisulfite solution may have substantially any concentration up to the saturation point. However, to avoid precipitation of solids in the extraction equipment, I prefer to operate at a concentration below about 25% by weight of the water-soluble bisulfite; and in order to avoid the use of excessive quantites of extractant solution, I ordinarily operate at a concentration above about 5%.

The quantity of bisulfite contacting the aldehyde-ketone mixture should be in at least equimolar ratio to the aldehydes contained therein, if it is desired to carry out a substantially complete separation between the aldehydes and ketones, and preferably the bisulfite should be in at least about 50 to 100% molar excess over the aldehydes.

Numerous solvents are suitable for extracting ketones from aqueous bisulfite solutions. Among them may be mentioned aliphatic hydrocarbons, such as pentanes, hexanes, heptanes, octanes, and the like, and the corresponding olefins; aromatic hydrocarbons, such as benzene, toluene, and xylene; alicyclic hydrocarbons, such as cyclopentane, cyclohexane, and methylcyclohexane; mixtures of hydrocarbons, such as petroleum naphthas; halogenated hydrocarbons, such as chloroform, carbon tetrachloride, and the various liquid fluoroalkanes and chlorofluoroalkanes; ethers, such as ethyl ether, isopropyl ether, and n-butyl ether; water-immiscible alcohols, such as n-butyl alcohol, carpryl alcohol, decyl alcohol, and the like; and esters, such as ethyl acetate, butyl acetate, methyl valerate, and the like. In general, I prefer to choose a solvent having a boiling point sufficiently far removed from the boiling points of the ketones to permit convenient removal of the solvent by fractional distillation.

The same group of solvents may be used for separating the aldehydes from the aqueous bisulfite raffinate, after removal of the ketones from the aqueous bisulfite solution.

My invention is effective broadly for separating ketones from aldehydes. By means of processes based on my invention, I am able to segregate groups of ketones substantially free from aldehydes, or containing greatly diminished proportions of aldehydes, and groups of aldehydes substantially free from ketones, or containing greatly diminished proportions of ketones. My invention may be used, for example, to separate mixtures containing aliphatic ketones, such as acetone, methyl ethyl ketone, methyl propyl ketone, diethyl ketone, methyl n-butyl ketone, methyl isobutyl ketone, dipropyl ketone, methylamyl ketone, and the like; alicyclic ketones, such as cyclohexanone and the like; aryl ketones, such as acetophenone, benzophenone, and the like; aliphatic aldehydes, such as acetaldehyde, n-butyraldehyde, isovaleraldehyde, n-heptaldehyde, and the like; aryl aldehydes, such as benzaldehyde and the like; and heterocyclic aldehydes, such as furfural and the like.

Figure 1 illustrates a preferred form of my invention, in which a mixture of aldehydes and ketones is introduced into an intermediate point of an extraction column wherein are flowing countercurrent streams of an aqueous bisulfite solution and an organic solvent.

A mixture of aldehydes and ketones in line 11 flows through heater 12 and line 13 into extractor 14 at an intermediate point. The extractor is equipped with a jacket 15, through which a heat-exchange fluid is passed to maintain the temperature within the extractor at a level of about 60° C. An aqueous solution containing 17.5% by weight of sodium bisulfite is introduced through line 16 into the top of extractor 15. As the aqueous stream flows downward countercurrent to the aldehyde-ketone mixture, it reacts with and extracts substantially all of the aldehydes contained therein, and a portion of the ketones. An organic solvent, having a specific gravity lower than the bisulfite solution, and a boiling point below the lowest-boiling ketone, is introduced through line 17 into the bottom of extractor 14. A suitable solvent may be chosen, for example, from the lower-boiling aliphatic hydrocarbons. As the solvent flows upward through the extractor, it extracts from the aqueous stream any free ketones dissolved therein, plus a small proportion of free aldehydes. The aqueous and organic streams thus purify each other, so that an organic solution of ketones, substantially free from aldehydes, emerges from the top of extractor 14 through line 18, and an aqueous solution of bisulfite-aldehyde adducts, substantially free from ketones, emerges from the bottom of extractor 14 through line 19.

The organic solution emerging through line 18 flows through heater 20 and line 21 into fractionator 22 at an intermediate point. Therein, the organic solvent is stripped out by reboiler 23, and passes overhead through line 24 into cooler 25. The condensate flowing from cooler 25 through line 26 into reflux drum 27 is divided into two streams, a portion being refluxed to fractionator 22 through line 28, line 29, valve 30, and line 31, and the remainder being recycled to the bottom of extractor 14 through line 28, line 32, valve 33, line 34, pump 35, line 36, heater 37, and line 17. Makeup solvent is added as required through line 38, ahead of pump 35.

A stream of ketones emerges from the bottom of fractionator 22 through line 39, and is sent through cooler 40 and line 41 to storage or further processing.

The aqueous solution of bisulfite-aldehyde adducts flowing from the bottom of extractor 14 through line 19 is transferred by pump 42, line 43, heater 44, and line 45 into stripper 46 at an intermediate point.

Before the aqueous stream enters stripper 46, an optional stripping operation (apparatus not shown) may be employed to remove any organic solvent that may be dissolved in the aqueous stream. Such a preliminary stripping operation may be carried out with an inert gas or steam at reduced pressure, and should preferably be carried out below about 80° C., in order to minimize the simultaneous release of aldehydes from the bisulfite-aldehyde adducts.

Reboiler 47 in stripper 46 is preferably operated above about 100° C. in order to decompose the bisulfite-aldehyde adducts and to strip out the aldehydes from solution. The aldehydes emerge overhead through line 48 into cooler 49, from which the condensate flows through line 50 into decanter 51. Any aqueous phase in decanter 51 is refluxed to stripper 46 through line 52, valve 53, and line 54. The aldehyde layer is withdrawn through line 55, valve 56, and line 57 to storage or further processing.

The regenerated aqueous bisulfite solution flowing from the bottom of stripper 46 through line 58 is recycled by pump 59 through line 60, heat exchanger 61, and line 16 to the top of extractor 14. Makeup bisulfite is added as required through line 62, ahead of pump 59.

It will readily be apparent to those skilled in the art that numerous modifications may be made in the details of the process illustrated in Figure 1. The directions of flow of aqueous and organic solvents in extractor 14, for example, may be reversed by choosing an organic solvent, such as methyl iodide, having a specific gravity greater than that of the aqueous bisulfite solution. The details of the separation of organic solvent from ketones by fractional distillation in column 22 will vary, depending on the relative boiling points involved, and on the presence or absence of impurities, such as water. Other methods of separating the ketones may also be employed, such as extractive distillation or azeotropic distillation.

Figure 2:
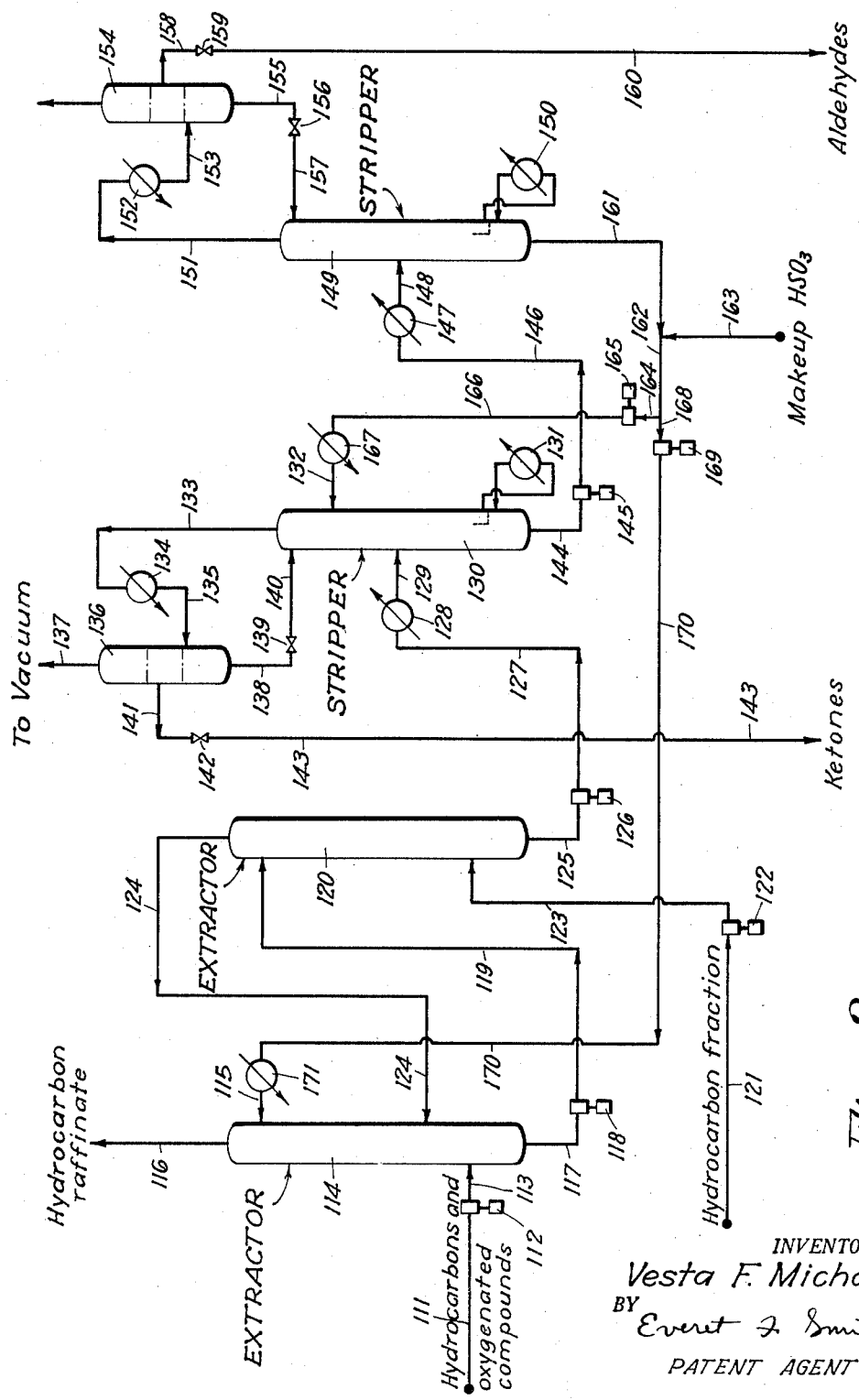

Figure 2 represents an embodiment of my invention particularly adapted to carry out a primary separation of aldehydes and ketones from a hydrocarbon solution thereof, such as the oil phase produced in a Fischer-Tropsch process employing an iron catalyst, and subsequently to effect the segregation of a substantially pure ketone stream and a substantially pure aldehyde stream.

A hydrocarbon stream containing aldehydes and ketones flows through line 111, pump 112, and line 113 into the bottom of extractor 114, in which it rises countercurrent to a downward-flowing aqueous 15% solution of sodium bisulfite, introduced through line 115 into the top of extractor 114. The temperature within the extractor is maintained preferably between about 20 and 30° C., and the greater part of the aldehydes and ketones in the hydrocarbon stream are converted into their bisulfite adducts, which are dissolved by the aqueous stream. Optionally, a small proportion, suitably less than about 0.5%, of a wetting agent, such as 2-ethylhexyl sulfate or other alkyl sulfate, may be added to the aqueous stream to increase the rate of extraction of the bisulfite adducts. The hydrocarbon raffinate emerges from the top of extractor 114 through line 116, and is sent to further processing for the isolation of other oxygenated compounds contained therein and for the production of a purified hydrocarbon stream. From the bottom of extractor 114 an aqueous solution of bisulfite-aldehyde and bisulfite-ketone adducts emerges through line 117 and is transferred by pump 118 through line 119 into the top of extractor 120, where it is contacted counter-currently at a temperature below about 30° C. with a suitable organic solvent, preferably a hydrocarbon fraction isolated from the hydrocarbon raffinate in line 116. The organic solvent is introduced through line 121, pump 122, and line 123 into the bottom of the extractor; and as it flows upward, it extracts a minor proportion of the aldehydes and ketones from the aqueous stream, together with any alcohols or other oxygenated-compound impurities that the aqueous stream has picked up in extractor 114. The organic-solvent stream emerges from extractor 120 through line 124, and is introduced into a lower intermediate portion of extractor 114, the various oxygenated compounds contained in the solvent stream being thereby returned to process.

A purified aqueous solution of bisulfite-aldehyde and bisulfite-ketone adducts emerges from the bottom of extractor 120 through line 125 and is transferred by pump 126 through line 127, heater 128, and line 129 into stripper 130 at an intermediate point. The stripper is operated preferably under a somewhat reduced pressure, so that reboiler 131 may strip out substantially all of the ketones, without decomposing an undesirably large proportion of the bisulfite-aldehyde adduct. For this purpose, a temperature between about 50 and 60° C. is suitable at the bottom of stripper 130. A stream of aqueous bisulfite solution is introduced through line 132 into an intermediate upper portion of stripper 130, in order to wash back any aldehydes that may have been liberated in the lower portion of the column. Ketones and water pass overhead through line 133 into cooler 134, from which the condensate flows through line 135 into decanter 136. The pressure within the stripper is maintained by connecting a vacuum source to decanter 136 through line 137. The aqueous phase in decanter 136 is refluxed to stripper 130 through line 138, valve 139, and line 140. The organic phase in decanter 136, comprising wet ketones, substantially free from aldehydes, is withdrawn through line 141, valve 142, and line 143 to storage or further processing.

The aqueous solution of substantially ketone-free bisulfite-aldehyde adducts flowing from the bottom of stripper 130 through line 144 is transferred by pump 145 through line 146, heater 147, and line 148 into stripper 149. Therein, reboiler 150 decomposes the bisulfite-aldehyde adducts, suitably at a temperature above about 100° C., and strips out the aldehydes. Aldehydes and water vapor pass overhead through line 151 into cooler 152, from which the condensate flows through line 153 into decanter 154. The aqueous phase from decanter 154 is refluxed to stripper 149 through line 155, valve 156, and line 157. The organic phase from decanter 154, comprising wet aldehydes, substantially free from ketones, is withdrawn through line 158, valve 159, and line 160 to storage or further processing.

A regenerated aqueous bisulfite solution emerges from the bottom of stripper 149 through line 161 and is combined in line 162 with makeup bisulfite solution, supplied through line 163. The combined streams are then divided, a portion being sent through line 164, pump 165, line 166, heat exchanger 167, and line 132 into an upper intermediate point of stripper 130, and the remainder being recycled to extractor 114 through line 168, pump 169, line 170, cooler 171, and line 115.

The following specific examples will more clearly illustrate my invention:

Example I

A liquid mixture composed of equal quantities by volume of methyl amyl ketone and n-heptaldehyde was reacted at around 25° C. with 1000 ml. of aqueous 7.5% sodium bisulfite, and the resulting aqueous solution was heated to 80° C. and extracted with 300 ml. of heptane. The aqueous raffinate was made alkaline and subjected to steam distillation. From the distillate was separated an organic phase having exactly the same refractive index as the n-heptaldehyde initially charged, and containing reactive carbonyl groups (as determined by the hydroxylammonium chloride procedure) corresponding to 93% of the n-heptaldehyde initially charged.

Methyl amyl ketone charged:
  Quantity, moles _____ 0.0718
  Refractive index, 20° C _____ 1.4079
n-Heptaldehyde charged:
  Quantity, moles _____ 0.0720
  Refractive index, 20° C _____ 1.4117
Carbonyls in hot heptane, moles _____ 0.0562
Organic phase of distillate:
  Carbonyls, moles _____ 0.0671
  Refractive index, 20° C _____ 1.4117
n-Heptaldehyde recover, per cent _____ 93

Example II

A mixture of n-heptaldehyde and methyl n-propyl ketone in 1:2 volume ratio was reacted at approximately 25° C. with 500 ml. of aqueous 7.5% sodium bisulfite. The resulting aqueous adduct solution was successively extracted at 25° C. with 450 ml. of pentane and at 80° C. with 450 ml. of heptane. The aqueous raffinate was made alkaline and steam distilled, and from it was isolated an organic layer representing 79% of the original n-heptaldehyde.

Methyl n-propyl ketone charged:
  Quantity, moles _____ 0.0948
  Refractive index, 20° C _____ 1.3899
n-Heptaldehyde charged:
  Quantity, moles _____ 0.0360
  Refractive index, 20° C _____ 1.4114
Carbonyls in pentane, moles _____ 0.0168
Carbonyls in heptane, moles _____ 0.0568
Organic phase of distillate:
  Carbonyls, moles _____ 0.0286
  Refractive index, 20° C _____ 1.4090
n-Heptaldehyde recovery, per cent _____ 79

Example III

A mixture of n-heptaldehyde and methyl n-propyl ketone in 2:1 volume ratio was subjected to processing steps as in Example II. The results were as follows:

Methyl n-propyl ketone charged:
  Quantity, moles _____ 0.0474
  Refractive index, 20° C _____ 1.3899
n-Heptaldehyde charged:
  Quantity, moles _____ 0.0720
  Refractive index, 20° C _____ 1.4116
Carbonyls in pentane, moles _____ 0.0088
Carbonyls in heptane, moles _____ 0.0325
Organic phase of distillate:
  Carbonyls, moles _____ 0.0553
  Refractive index, 20° C _____ 1.4106
n-Heptaldehyde recovery, percent _____ 77

Example IV

To a mixture of n-heptaldehyde and methyl amyl ketone in 2:1 volume ratio was added a volume of n-butyl alcohol equal to the volume of n-heptaldehyde, and the mixture was reacted at approximately 25° C. with 1000 ml. of aqueous 7.5% sodium bisulfite. The resulting aqueous solution was successively extracted at 25° C. with 450 ml. of pentane and at 80° C. with 450 ml. of heptane. The aqueous raffinate was made alkaline and steam distilled, and from it was isolated an organic layer representing 91% of the original n-heptaldehyde. The refractive index of the distillate organic layer, however, was slightly higher than that of the original aldehyde. When a sample of the organic layer was oxidized with acid potassium dichromate, 7% of it by volume was recovered as non-acidic material having a refractive index of 1.4217, whereas methyl amyl ketone has an index of 1.4079. It may be concluded, therefore, that the recovered n-heptaldehyde container substantially less than 7% by volume of methyl amyl ketone.

Methyl amyl ketone charged:
    Quantity, moles _____ 0.0359
    Refractive index, 20° C _____ 1.4079
n-Heptaldehyde charged:
    Quantity, moles _____ 0.0720
    Refractive index, 20° C _____ 1.4106
n-Butyl alcohol charged:
    Quantity, moles _____ 0.1092
    Refractive index, 20° C _____ 1.3981
Carbonyls in pentane, moles _____ 0.0139
Carbonyls in heptane, moles _____ 0.0274
Organic phase of distillate:
    Carbonyls, moles _____ 0.0657
    Refractive index, 20° C _____ 1.4109
n-Heptaldehyde recovery, percent _____ 91

The above examples represent specific embodiments of my invention, adapted to the separation of specific mixtures of aldehydes and ketones. It will be understood, however, that my invention is not limited thereto, but includes the broad operation of effecting a separation between aldehydes and ketones by treatment with a water-soluble bisulfite at an elevated temperature. In general, it can be said that any modifications or equivalents that would ordinarily occur to those skilled in the art are to be considered as lying within the scope of my invention.

In accordance with the foregoing specification, I claim as my invention:

1. In a process for separating an aliphatic methyl ketone from a mixture comprised thereof with an aldehyde and wherein said ketone and aldehyde are capable of forming addition compounds with bisulfite, the steps which comprise contacting said mixture at a pH between about 2.2 and 8 and at a temperature below about 40° C with an aqueous solution containing a water-soluble bisulfite whereby stable bisulfite addition compounds of said ketone and aldehyde are formed, subjecting the resulting aqueous reaction mixture to an elevated temperature within the range of from about 40 to 80° C., within which range said ketone does not form a stable bisulfite addition compound, and separating said ketone from the mixture.

2. In a process for separating an aliphatic methyl ketone from a mixture comprised thereof with an aldehyde and wherein said ketone and aldehyde are capable of forming addition compounds with bisulfite, the steps which comprise contacting said mixture at a pH between about 2.2 and 8 and at a temperature below about 40° C. with an aqueous solution containing a water-soluble bisulfite in greater than equimolar ratio to said aldehyde and ketone whereby stable bisulfite addition compounds of said ketone and aldehyde are formed, subjecting the resulting aqueous reaction mixture to an elevated temperature within the range of from about 40 to 80° C., within which range said ketone does not form a stable bisulfite addition compound, and separating said ketone from the mixture.

3. In a process for separating an aliphatic methyl ketone from a mixture comprised thereof with an aldehyde and wherein said ketone and aldehyde having essentially the same capacities for forming addition compounds with bisulfite, the steps which comprise contacting said mixture at a pH between about 2.2 and 8 and at a temperature below about 40° C. with an aqueous solution containing a water-soluble bisulfite whereby stable bisulfite addition compounds of said ketone and aldehyde are formed, subjecting the resulting aqueous reaction mixture to an elevated temperature within the range of from about 40 to 80° C., within which range said ketone does not form a stable bisulfite addition compound, and separating said ketone from the mixture.

4. In a process for separating an aliphatic methyl ketone from an aqueous mixture comprised thereof with an aldehyde, the steps which comprise forming bisulfite addition compounds of said ketone and said aldehyde, and thereafter heating the resulting mixture of aldehyde and ketone bisulfite addition compounds to a temperature within the range of about 40 to about 80° C. whereby said ketone bisulfite addition compound is decomposed, and thereafter separating said ketone from the mixture.

5. The process of claim 1 in which the ketone is methyl n-propyl ketone and the aldehyde is heptaldehyde.

6. The process of claim 1 in which the ketone is methyl amyl ketone and the aldehyde is heptaldehyde.

7. In a process for separating aldehydes from aliphatic methyl ketones, the steps which comprise commingling a mixture containing an aldehyde and an aliphatic methyl ketone with an aqueous solution of a water-soluble bisulfite at a temperature of from about 40 to below about 100° C. whereby a bisulfite addition compound of said aldehyde is formed to the substantial exclusion of the corresponding ketone bisulfite addition compound, and thereafter separating the free ketone from said aldehyde bisulfite addition compound.

8. In a process for separating aldehydes from aliphatic methyl ketones, the steps which comprise commingling a mixture containing an aldehyde and an aliphatic methyl ketone with an aqueous solution of a water-soluble bisulfite at a temperature of from about 40 to below about 100° C. whereby a bisulfite addition compound of said aldehyde is formed to the substantial exclusion of the corresponding ketone bisulfite addition compound, thereafter extracting the resulting mixture with a substantially water-immiscible organic solvent for said ketone, said solvent being inert with respect to the components of said mixture and having a specific gravity different therefrom, and allowing the mixture to form two liquid layers, one comprising an aqueous solution consisting essentially of said aldehyde addition compound and the other comprising said organic solvent and ketone.

9. The process of claim 8 in which the mixture of aldehyde and ketone is commingled with an aqueous solution of a water-soluble bisulfite at a temperature of from about 40 to 80° C.

10. The process of claim 8 in which the mixture containing an aldehyde and an aliphatic methyl ketone are commingled with an aqueous solution of a water-soluble bisulfite having a pH of from about 5 to about 8 at a temperature of from about 40 to about 80° C.

11. In a process for separating aldehydes from aliphatic methyl ketones, the steps which comprise commingling with an aqueous solution of a water-soluble bisulfite a mixture containing an aldehyde and an aliphatic methyl ketone, both of which are substantially miscible with aqueous bisulfite solutions, at a temperature of from about 40 to below about 100° C. whereby a bisulfite addition compound of said aldehyde is formed to the substantial exclusion of the corresponding ketone bisulfite addition compound, thereafter extracting the resulting mixture with a substantially water-immiscible organic solvent for said ketone, said solvent being inert with respect to the components of said mixture and having a specific gravity different therefrom, and allowing the mixture to form two liquid layers, one comprising an aqueous solution consisting essentially of said aldehyde addition compound and the other comprising said organic solvent and ketone.

12. The process of claim 1 in which the aldehyde and ketone involved are both miscible with aqueous bisulfite solutions.

VESTA F. MICHAEL.

REFERENCES CITED

The following references are of record in the file of this patent:

UNITED STATES PATENTS

| Number | Name | Date |
|---|---|---|
| 2,228,281 | Huijser et al. | June 30, 1942 |

FOREIGN PATENTS

| Number | Country | Date |
|---|---|---|
| 472,545 | Great Britain | Sept. 23, 1937 |

OTHER REFERENCES

Romeo et al., Chemical Abstracts, vol. 20, 561 (1926).